United States Patent
Taki et al.

(10) Patent No.: US 7,643,913 B2
(45) Date of Patent: Jan. 5, 2010

(54) VEHICLE REMOTE CONTROL APPARATUS AND SYSTEM

(75) Inventors: Naoki Taki, Okazaki (JP); Akito Adachi, Aichi (JP); Reiko Mitsuhashi, Nagoya (JP); Keizoh Kawaguchi, Okazaki (JP); Mitsuyoshi Natsume, Hekinan (JP); Tatsuya Kato, Nagoya (JP)

(73) Assignees: Toyota Jidosha Kabushiki Kaisha, Toyota-shi, Aichi-ken (JP); Denso Corporation, Kariya-shi, Aichi (JP)

( * ) Notice: Subject to any disclaimer, the term of this patent is extended or adjusted under 35 U.S.C. 154(b) by 351 days.

(21) Appl. No.: 11/660,143

(22) PCT Filed: Mar. 31, 2006

(86) PCT No.: PCT/JP2006/307403

§ 371 (c)(1), (2), (4) Date: Feb. 13, 2007

(87) PCT Pub. No.: WO2006/112274

PCT Pub. Date: Oct. 26, 2006

(65) Prior Publication Data

US 2008/0065274 A1 Mar. 13, 2008

(30) Foreign Application Priority Data

Apr. 13, 2005 (JP) ............................ 2005-115981

(51) Int. Cl.
*G05D 1/00* (2006.01)

(52) U.S. Cl. ............................... 701/2; 701/29; 701/30; 340/426.16; 340/438

(58) Field of Classification Search .................... 701/1, 701/2, 29, 30; 455/423, 39; 340/426.16, 340/426.18, 901, 425.5, 438, 439
See application file for complete search history.

(56) References Cited

U.S. PATENT DOCUMENTS

2005/0154500 A1* 7/2005 Sonnenrein et al. ............ 701/1

FOREIGN PATENT DOCUMENTS

| CN | 15555181 | 12/2004 |
|---|---|---|
| DE | 198 01 543 | 7/1999 |
| JP | 2004-102939 | 4/2004 |

OTHER PUBLICATIONS

International Search Report dated Jul. 26, 2006.
Written Opinion of the ISA dated Jul. 31, 2006.
Chinese Office Action dated Mar. 21, 2008.

* cited by examiner

*Primary Examiner*—Gertrude Arthur Jeanglaud
(74) *Attorney, Agent, or Firm*—Finnegan, Henderson, Farabow, Garrett & Dunner, LLP

(57) ABSTRACT

A vehicle remote control apparatus for causing a vehicle to perform a requested operation in response to a remote operation request from a vehicle user includes an acquisition unit configured to acquire information about vehicle condition of the vehicle, and an operation instruction transmission controlling unit configured to compare a remote operation requested from the vehicle user with the information about the vehicle condition, to transmit an operation instruction corresponding to the requested remote operation to the vehicle if the requested remote operation has not been performed, and to refrain from transmitting an operation instruction corresponding to the requested remote operation to the vehicle if the requested remote operation has already been performed at the vehicle and is thus not performable.

10 Claims, 8 Drawing Sheets

FIG.6

MAY 5$^{TH}$, 2004  13:02:35

TO MR. XXX

【PLEASE SELECT OPERATION】

☐ OPEN DRIVER-SEAT WINDOW

☐ CLOSE DRIVER-SEAT WINDOW

☐ OPEN PASSENGER-SEAT WINDOW

☐ CLOSE PASSENGER-SEAT WINDOW

⋮

EXECUTE

FIG.8

MAY 5<sup>TH</sup>, 2004  13:02:35

TO MR. XXX

【PLEASE SELECT OPERATION】

☐ OPEN DRIVER-SEAT WINDOW

☐ CLOSE PASSENGER-SEAT WINDOW

⋮

| EXECUTE |

FIG.9

MAY 5^TH, 2004  13:02:35

TO MR. XXX

【PLEASE SELECT OPERATION】

☐OPEN DRIVER-SEAT WINDOW

☐CLOSE DRIVER-SEAT WINDOW

☐OPEN PASSENGER-SEAT WINDOW

☐CLOSE PASSENGER-SEAT WINDOW

⋮

EXECUTE

VEHICLE REMOTE CONTROL APPARATUS AND SYSTEM

TECHNICAL FIELD

The present invention generally relates to a vehicle remote control apparatus that causes a vehicle to perform a requested operation in response to a remote operation request issued from a vehicle user, and particularly relates to a vehicle remote control apparatus and system for which the responsiveness of a result report supplied a vehicle user having requested the remote operation is improved.

BACKGROUND ART

Conventionally, an apparatus/system that causes a vehicle to perform a requested operation in response to a remote operation request issued from a vehicle user is known (for example, see Patent Document 1).

The apparatus/system disclosed in Patent Document 1 serves to allow vehicle operations such as the closing of the windows and the turning off of the hazard lamps to be performed via remote control by the user using a portable phone.

[Patent Document 1] Japanese Patent Application Publication No. 2004-102939

The related-art apparatus/system disclosed in Patent Document 1 described above is configured such that the user uses a portable phone to remotely control the vehicle via a center. Since the user cannot see the vehicle at the time of remote control in most cases, the operation that has already been performed may be needlessly requested through remote control if the condition of the vehicle at the time of the remote operation request differs from the vehicle condition that was checked by using the portable phone last time (e.g., another user may have acted on the vehicle on the spot). For example, although the windows are already closed, a remote operation request to close the windows may be issued.

In the related-art apparatus/system disclosed in Patent Document 1, the center transmits to the vehicle a remote operation request issued from the user without checking the necessity of the requested operation, and, then, the vehicle performs the requested operation without checking the necessity of the user's remote operation request transmitted from the center (see paragraphs [0052] and [0028] of Patent Document 1).

This undermines the responsiveness of the result report that is sent to the vehicle user who has requested a remote operation (in this case, such a report serves to inform the user that the requested remote operation has been completed, or that the requested remote operation has failed but the current condition of the vehicle already satisfies the intended purpose). From a different perspective, it can be said that no communication between the center and the vehicle was necessary since the vehicle did not perform any operation in response to the operation instruction from the center.

Accordingly, there is a need for a vehicle remote control apparatus and system that have improved responsiveness with respect to a result report that is to be sent to the vehicle user having requested a remote operation.

DISCLOSURE OF INVENTION

It is a general object of the present invention to provide a vehicle remote control apparatus and system that substantially obviate one or more problems caused by the limitations and disadvantages of the related art.

It is another and more specific object of the present invention to provide a vehicle remote control apparatus and system that have improved responsiveness with respect to a result report that is to be sent to the vehicle user having requested a remote operation.

In order to achieve these objects according to one aspect of the present invention, a vehicle remote control apparatus for causing a vehicle to perform a requested operation in response to a remote operation request from a vehicle user includes an acquisition unit configured to acquire information about vehicle condition of the vehicle, and an operation instruction transmission controlling unit configured to compare a remote operation requested from the vehicle user with the information about the vehicle condition, to transmit an operation instruction corresponding to the requested remote operation to the vehicle if the requested remote operation has not been performed, and to refrain from transmitting an operation instruction corresponding to the requested remote operation to the vehicle if the requested remote operation has already been performed at the vehicle and is thus not performable.

In this aspect of the present invention, the acquisition unit obtains the information about the vehicle condition by receiving vehicle condition information that is detected in the vehicle for transmission to the vehicle remote control apparatus.

In this aspect of the present invention, the fact that the requested remote operation has already been performed at the vehicle and is thus not performable refers to a situation in which a remote operation to close a window is requested when this window of the vehicle is already closed, for example.

In this aspect of the present invention, the vehicle remote control apparatus knows the current vehicle condition of the vehicle subjected to remote control, and refrains from transmitting an operation instruction with respect to such an operation that there is no point in transmitting the operation request to the vehicle. This reduces a time length required to send a result report to the vehicle user who has requested the remote operation.

In this aspect of the present invention, a presenting unit may preferably be provided to present performable remote operations to the vehicle user based on the information about the vehicle condition in response to the acquisition by the acquisition unit of the information about the vehicle condition.

In such a case, the presenting unit may be configured to present all possible remote operations to the vehicle user while making only the performable remote operations selectable among the possible remote operations based on the information about the vehicle condition, or may be configured to present only the performable remote operations to the vehicle user based on the information about the vehicle condition.

In this aspect of the present invention, the presenting unit may be configured to ascertain a given remote operation as a non-performable remote operation by finding the possibility of failure if the given remote operation is not performed for a predetermined time period according to the information about the vehicle condition of the vehicle acquired by the acquisition unit.

According to another aspect of the present invention, a vehicle remote control system for causing a vehicle to perform a requested operation in response to a remote operation request from a vehicle user includes a vehicle having an on-vehicle device, wherein the on-vehicle device is configured to perform an operation with respect to the vehicle according to an operation instruction from a vehicle remote control apparatus, and to detect vehicle condition of the vehicle for notification to the vehicle remote control apparatus, and wherein the vehicle remote control apparatus is configured to compare a remote operation requested from the vehicle user with the information about the vehicle condition obtained from the on-vehicle device, to transmit an operation instruction corresponding to the requested remote operation to the vehicle if the requested remote operation has not been performed, and to refrain from transmitting an operation instruction corresponding to the requested remote operation to the vehicle if the requested remote operation has already been performed at the vehicle and is thus not performable.

In this aspect of the present invention, the fact that the requested remote operation has already been performed at the vehicle and is thus not performable refers to a situation in which a remote operation to close a window is requested when this window of the vehicle is already closed, for example.

In this aspect of the present invention, the vehicle remote control apparatus knows the current vehicle condition of the vehicle subjected to remote control, and refrains from transmitting an operation instruction with respect to such an operation that there is no point in transmitting the operation request to the vehicle. This reduces a time length required to send a result report to the vehicle user who has requested the remote operation.

In this aspect of the present invention, the vehicle remote control apparatus may preferably transmit information about performable remote operations to the communication terminal of the vehicle user based on the information about the vehicle condition in response to receipt of the information about the vehicle condition from the on-vehicle device.

In such a case, the vehicle remote control apparatus may be configured to transmit information about all possible remote operations to the communication terminal, with the performable remote operations made discernible, based on the information about the vehicle condition, or may be configured to transmit only the information about the performable remote operations to the communication terminal based on the information about the vehicle condition, in response to receipt of the information about the vehicle condition from the on-vehicle device.

Further, the vehicle remote control apparatus may be configured to ascertain a given remote operation as a non-performable remote operation if the given remote operation is not performed for a predetermined time period according to the information about the vehicle condition obtained from the on-vehicle device.

According to at least one embodiment of the present invention, a vehicle remote control apparatus and system are provided that have improved responsiveness with respect to a result report that is to be sent to the vehicle user having requested a remote operation.

BRIEF DESCRIPTION OF DRAWINGS

FIG. 6 is an illustrative drawing showing an example of the display screen of a Web page;

FIG. 8 is an illustrative drawing showing an example of the display screen of a Web page; and FIG. 9 is an illustrative drawing showing an example of the display screen of a Web page.

BEST MODE FOR CARRYING OUT THE INVENTION

In the following, the best mode for carrying out the present invention will be described by referring to embodiments with reference to the accompanying drawings. The description that follows is premised on the system in which vehicle conditions are reported from the vehicle to a center via a communication system after the parking of the vehicle (ignition-off), and in which this reporting is also performed subsequently when a change occurs in the vehicle conditions.

In the following, a vehicle remote control system according to an embodiment (first embodiment) of the present invention will be described with reference to FIG. 1 through FIG. 6. In a vehicle remote control system 100 according to this embodiment, the center (vehicle remote control apparatus) knows the vehicle conditions in advance. If a remote operation requested by a vehicle user has already been performed, an operation instruction is not issued to the vehicle, and a report indicative of the completion or failure of the remote operation is sent to the vehicle user.

Figure 1:
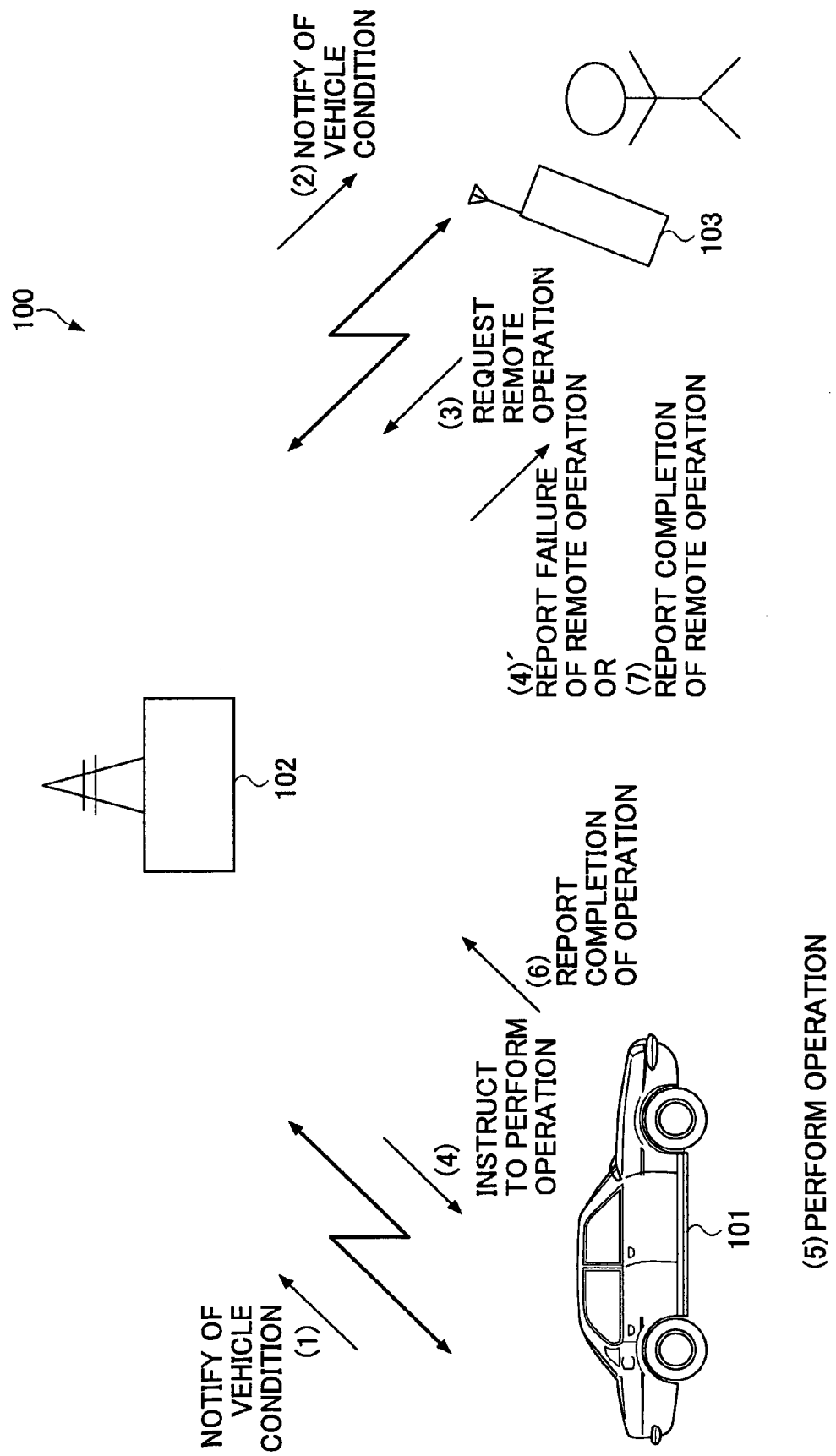
FIG. 1 is a drawing showing the outline of the entirety of a system relating to the remote control of a vehicle according to an embodiment of the present invention.

FIG. 1 is a drawing showing the outline of the entirety of a system relating to the remote control of a vehicle according to this embodiment.

The vehicle remote control system 100 of this embodiment includes a vehicle 101 subjected to remote control, a center (remote control apparatus) 102 that is a communication station managed and operated by the vehicle manufacturer, an automobile dealer, or a professional service provider, and a communication terminal 103 owned by the user (owner) of the vehicle.

The user of the vehicle uses the communication terminal 103 to cause the vehicle 101 to perform a predetermined operation via the center 102. As a general rule, this remote control is not allowed unless the ignition switch of the vehicle 101 is off.

The vehicle 101 subjected to remote control notifies the center 102 of the condition of the vehicle at the turning-off of the ignition switch (e.g., the doors are not locked, the driver-seat window is open, the passenger-seat window is closed, the hazard lamps are on (flashing), and so on).

Thereafter, the vehicle 101 notifies the center 102 of the condition of the vehicle each time the vehicle condition is modified (e.g., by a local operation).

Having received the notice, the center 102 stores and updates the vehicle condition, and also transmits email to the communication terminal 103 of the user of the vehicle.

Having received the notice, the user of the vehicle may use the communication terminal 103 to transmit a remote operation instruction (e.g., to lock the doors, to turn off the hazard lamps, or to close the power windows/sunroof) to the center 102. This is performed on a Web page by accessing the Web page provided by the center 102 by use of the communication terminal 103 and by confirming user authenticity.

Upon receiving the remote operation request from the vehicle user, the center 102 refers to the vehicle condition of the vehicle 101 stored in memory so as to check whether the requested remote operation is performable. Only when the request is performable, does the center 102 instruct the vehicle 101 to perform the operation. In response to the instruction, the vehicle 101 performs the operation on its own.

Upon completing the operation, the vehicle 101 reports the completion to the center 102. In response to the report of the completion of the operation from the vehicle 101, the center 102 transmits email to the communication terminal 103 of the vehicle user so as to report the completion of the remote operation.

In the following, the configuration and operation procedure of the vehicle remote control system according to this embodiment will be described in greater detail with reference to FIG. 2 through FIG. 6.

Figure 2:
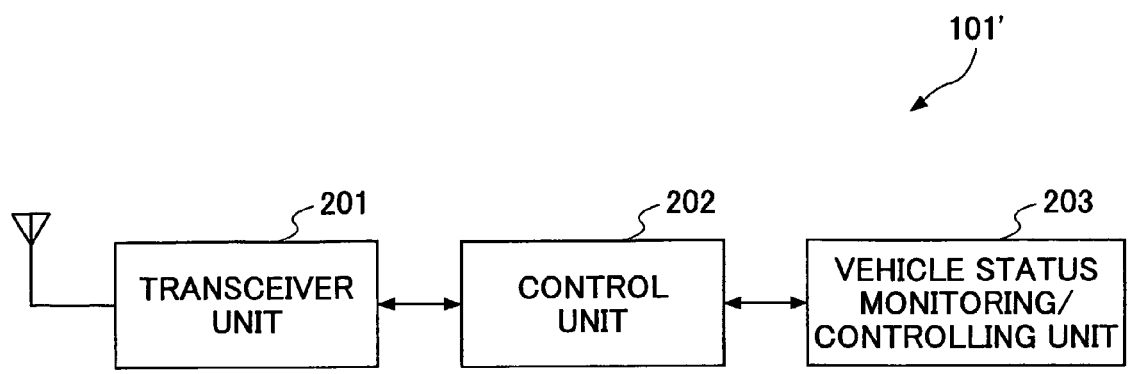
FIG. 2 is a schematic block diagram of an on-vehicle device that is carried on the vehicle subjected to remote control and performs an operation requested by the center.

FIG. 2 is a schematic block diagram of an on-vehicle device 101' that is carried on the vehicle 101 subjected to remote control and performs an operation requested by the center 102.

The on-vehicle device 101' includes a transceiver unit 201 for transmitting/receiving information to/from the center 102 and a control unit 202 for controlling each part of the on-vehicle device 101'.

The on-vehicle device 101' further includes a vehicle status monitoring/controlling unit 203, which monitors the vehicle condition and performs various operations to change the vehicle condition.

The control unit 202 transmits the information about the vehicle condition of the vehicle 101 detected by the vehicle status monitoring/controlling unit 203 to the center 102 by use of the transceiver unit 201. Such transmission occurs when the ignition switch of the vehicle 101 is turned off.

Further, when the transceiver unit 201 receives an operation instruction regarding the vehicle condition from the center 102, the control unit 202 controls the vehicle status monitoring/controlling unit 203 to perform the relevant operation.

Figure 3:
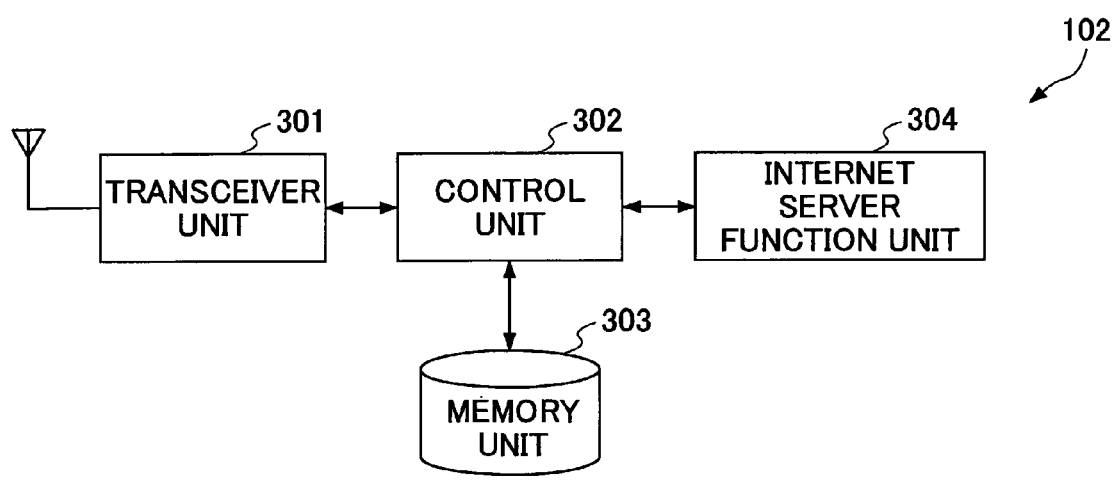
FIG. 3 is a schematic block diagram of the center that causes the vehicle to perform a requested operation in response to a request from a vehicle user.

FIG. 3 is a schematic block diagram of the center (vehicle remote control apparatus) 102 that causes the vehicle 101 (i.e., the on-vehicle device 101' thereof) to perform a requested operation in response to a request from a vehicle user.

The center 102 includes a transceiver unit 301 for transmitting/receiving information to/from the on-vehicle device 101' and a control unit 302 for controlling each part of the center 102.

The center 102 includes a memory unit 303 operable to store predetermined data in database format. The memory unit 303 may be any type of memory medium.

The center 102 further includes an Internet server function unit 304. The Internet server function unit 304 provides a Web page that is accessible by a vehicle user using the communication terminal 103, and is operable to transmit email to the communication terminal 103.

The control unit 302 may receive, via the transceiver unit 301, vehicle condition information from the on-vehicle device 101' of the vehicle 101 with the ignition off. In response, the control unit 302 stores the information in the memory unit 303 in such a manner that the information is associated with the vehicle 101 that is the origin of transmission. Namely, the memory unit 303 stores the information about the latest vehicle condition of the vehicle 101.

Further, in response to the vehicle condition information received via the transceiver unit 301 from the on-vehicle device 101' of the vehicle 101, the control unit 302 controls the Internet server function unit 304 to transmit email to the communication terminal 103 (i.e., to its email address) of the vehicle owner so as to report the vehicle condition information.

Figure 4:
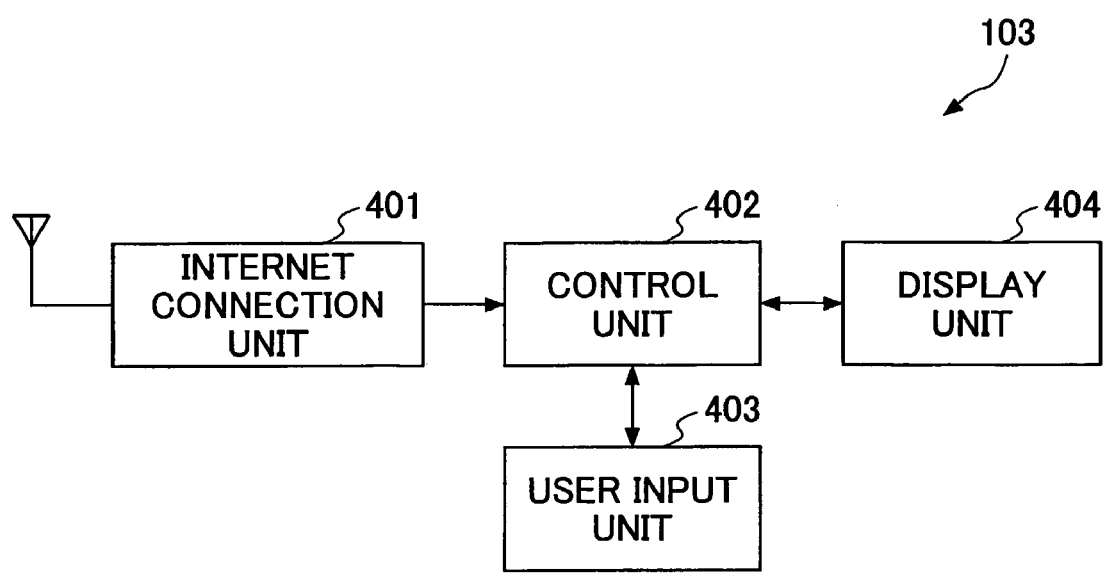
FIG. 4 is a schematic block diagram of a communication terminal used by a vehicle user when performing a remote operation.

FIG. 4 is a schematic block diagram of the communication terminal 103 used by a vehicle user when performing a remote operation. In the present embodiment, the communication terminal 103 may be a portable telephone connectable to the Internet. Alternatively, the communication terminal 103 may be a computer terminal such as a PDA (personal digital assistants) or a notebook PC (personal computer), or may be a fixed terminal such as a desktop PC.

The communication terminal 103 includes an Internet connection unit 401 and a control unit 402. The Internet connection unit 401 serves to receive email from the Internet server function unit 304 of the center 102, and is also used to access the Web page provided by the Internet server function unit 304. The control unit 402 controls each part of the communication terminal 103.

The communication terminal 103 further includes a user input unit 403. The user input unit 403 is used by the vehicle user to enter any character strings into the communication terminal 103, and is also used to select/determine a menu item.

The communication terminal 103 further includes a display unit 404 for visually presenting a received email message or an accessed Web page to the user. In the present embodiment, the display unit 404 may include a small-size LCD (liquid crystal display), for example. Alternatively, the user input unit 403 and the display unit 404 may be combined to form a single unitary structure, thereby providing a touch panel.

Figure 5:
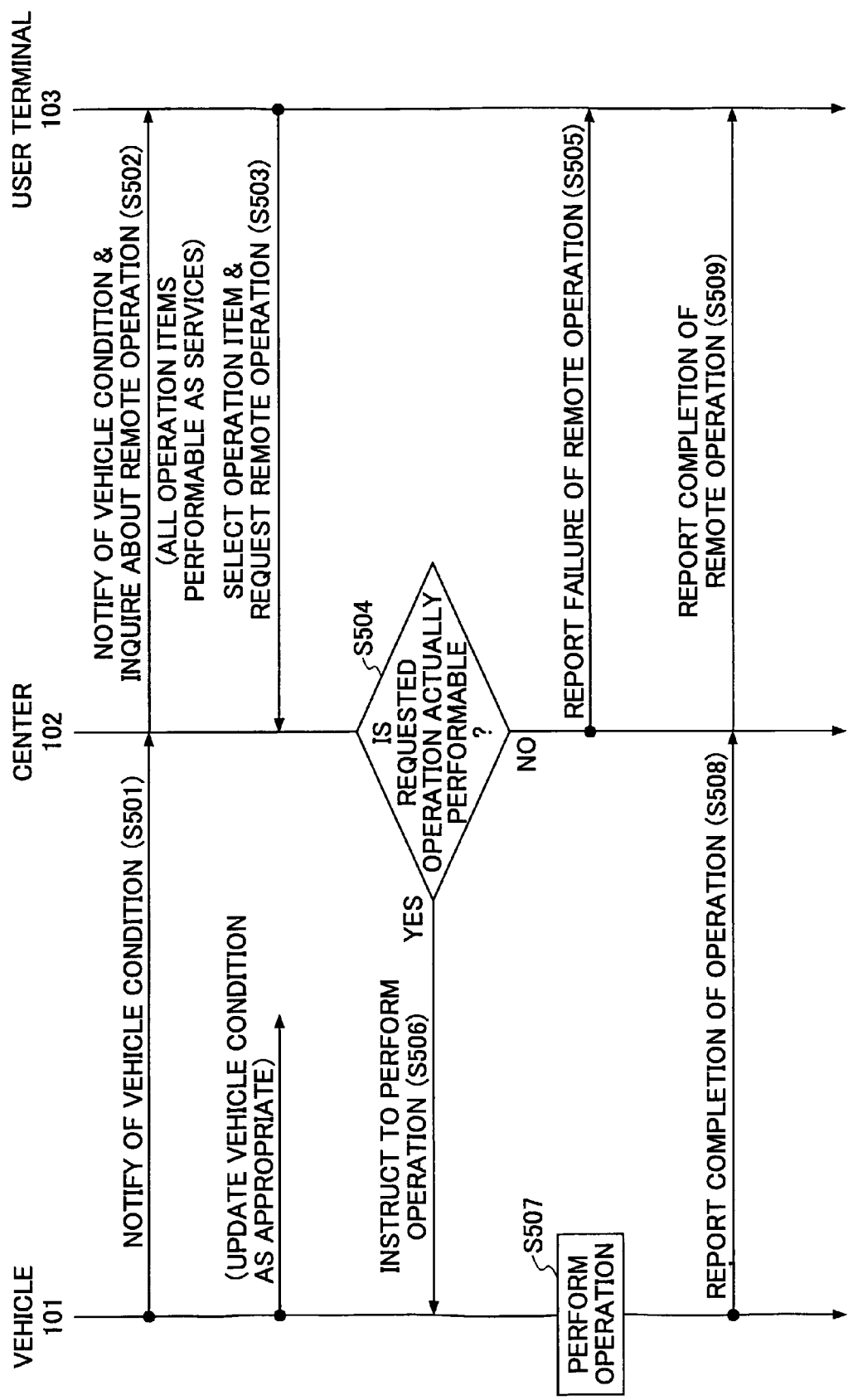
FIG. 5 is a sequence chart showing a remote control process according to the first embodiment.

In the following, a description will be given of the flow of a process of vehicle remote control according to the present embodiment in which the apparatuses have the configurations as described above. FIG. 5 is a sequence chart showing a remote control process according to the present embodiment.

When the ignition switch of the vehicle 101 is turned off, the control unit 202 of the on-vehicle device 101' of the vehicle 101 transmits the vehicle condition of the vehicle 101 detected by the vehicle status monitoring/controlling unit 203 to the center 102 by use of the transceiver unit 201 (S501). The notification of the vehicle condition to the center 102 is performed as appropriate each time the vehicle condition is modified at the site of the vehicle 101 through a local operation by another user, for example, so that the center 102 always knows the latest vehicle condition of the vehicle 101.

Upon receiving the vehicle condition information of the vehicle 101 via the transceiver unit 301, the center 102 stores the vehicle condition information in the memory unit 303 such that the vehicle condition information is paired with (associated with) the vehicle 101, and also transmits email inclusive of the vehicle condition information to the communication terminal 103 of the user of the vehicle 101 by use of the Internet server function unit 304.

This email contains a link to the Web page for remote control request. The user receives this email at the communication terminal 103, and checks the email on the display unit 404. The use may then select the link by use of the user input unit 403 to access the Web page in order to request a remote operation after user authentication.

In this manner, the email for notifying the vehicle user of the vehicle condition includes an inquiry to the vehicle user, asking whether a remote operation is to be requested based on the vehicle condition.

As the vehicle user uses the communication terminal 103 to access the Web page for remote control request, the Internet server function unit 304 of the center 102 presents all the remotely performable items provided as its services on the Web page, thereby asking the vehicle user to make selection/determination.

FIG. 6 is an illustrative drawing showing an example of the display screen of such a Web page. In this example, items relating to opening/closing of the driver-seat window and passenger-seat window are displayed. Other operation items may be displayed by scrolling down. The execution button is always viewable regardless of the scrolled position, so that the user can press (select/click) the execution button after selecting a desired operation, thereby requesting the center 102 to perform the selected operation.

When the vehicle user desiring a remote operation selects an operation item and requests the execution of the operation (S503), the center 102 matches the requested operation item against the vehicle condition information stored in memory so as to check whether the requested operation item is actually performable (S504).

For example, when the driver-seat window is already closed, a remote operation request to close the driver-seat window is ascertained as being non-performable because the requested operation has already been performed.

If the remote control item requested by the vehicle user is ascertained to be non-performable ("NO" at S504), the control unit 302 of the center 102 does not transmit any instruction to the vehicle 101 (i.e., to its on-vehicle device 101'), and instead transmits a report to the communication terminal 103 to inform the user that the requested remote operation has failed because such operation has already been performed (S505).

If the remote operation item requested by the vehicle user is ascertained to be performable ("YES" at S504), the control unit 302 of the center 102 uses the transceiver unit 301 to transmit an operation instruction to the vehicle 101 (i.e., to its on-vehicle device 101') (S506).

In the vehicle 101, the transceiver unit 201 receives the operation instruction from the center 102. In response, the control unit 202 instructs the vehicle status monitoring/controlling unit 203 to perform the relevant operation (S507).

Upon the completion of the operation, the control unit 202 of the on-vehicle device 101' transmits a report indicative of the completion of the operation to the center 102 via the transceiver unit 201 (S508).

In the center 102, the transceiver unit 301 receives the report of the completion of the operation from the vehicle 101. In response, the control unit 302 instructs the Internet server function unit 304 to create a completion reporting mail that informs the user of the completion of the remote operation requested by the vehicle user. The created mail is transmitted to the communication terminal 103 (S509).

According to the present embodiment described above, the center 102 has the latest vehicle condition information uploaded from the vehicle 101 so as to know the current vehicle condition of the vehicle 101. With such an arrangement, if the center 102 ascertains that the remote operation requested from the vehicle user is not performable in light of the current vehicle condition, no operation instruction is transmitted to the vehicle 101. This reduces the expenses for communication between the vehicle 101 and the center 102, and also makes it possible to promptly send a report of the results of the operation to the vehicle user as a response to the remote operation request, thereby improving responsiveness.

In the following, a vehicle remote control system according to another embodiment (second embodiment) of the present invention will be described with reference to FIG. 7 through FIG. 9. The configuration of the system and the configuration of each apparatus of this embodiment are the same as those of the first embodiment, and a detailed description and graphical illustration thereof will be omitted.

The first embodiment described above is configured such that all the operation items provided as services are displayed as choices to the vehicle user attempting to request a remote operation. Alternatively, the present embodiment checks whether these items are performable at the time of display.

Figure 7:
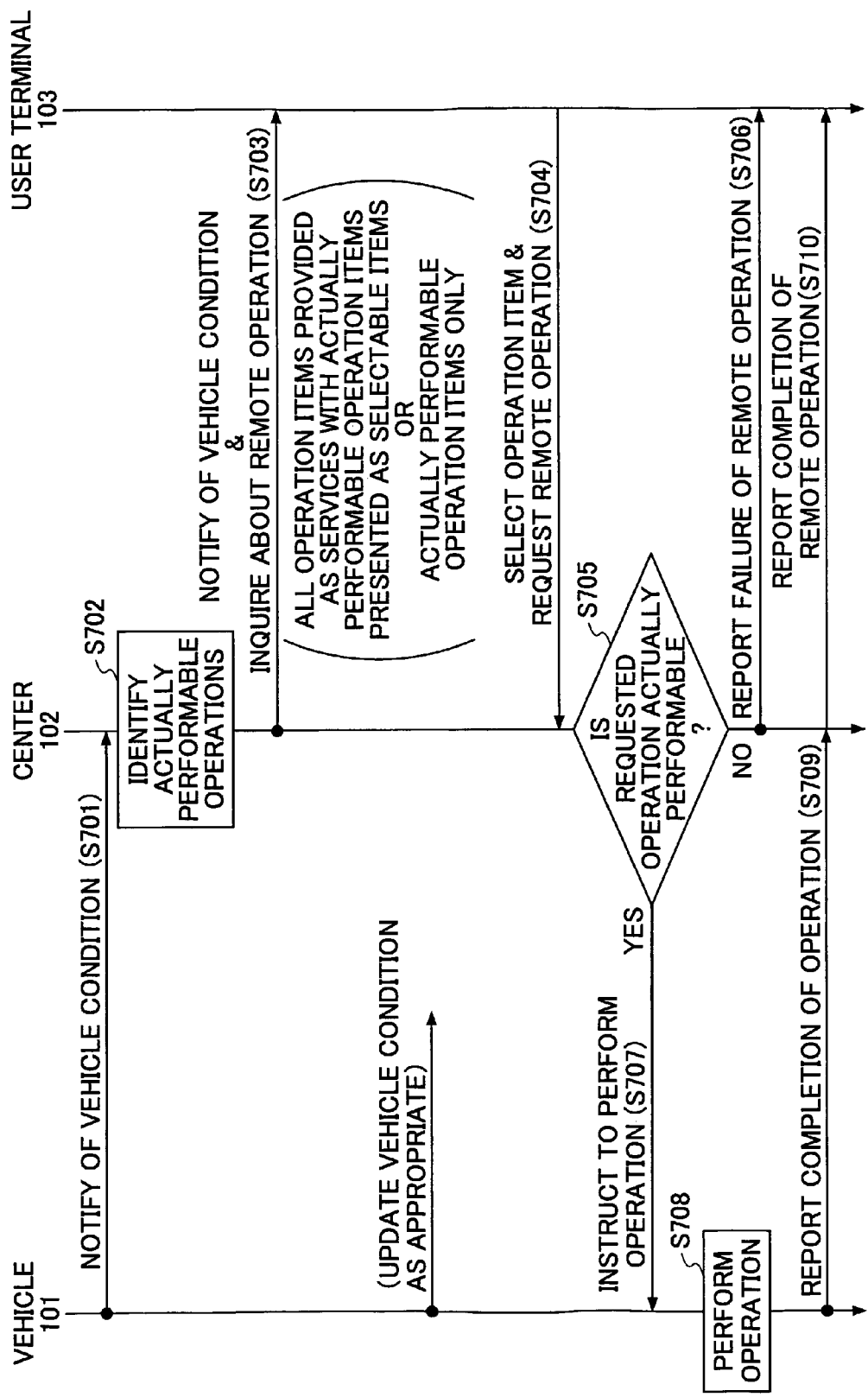
FIG. 7 is a sequence chart showing a remote control process according to the second embodiment.

FIG. 7 is a sequence chart showing a remote control process according to the present embodiment. When the ignition switch of the vehicle 101 is turned off, the control unit 202 of the on-vehicle device 101' of the vehicle 101 transmits the vehicle condition of the vehicle 101 detected by the vehicle status monitoring/controlling unit 203 to the center 102 by use of the transceiver unit 201 (S701). The notification of the vehicle condition to the center 102 is performed as appropriate each time the vehicle condition is modified at the site of the vehicle 101 through a local operation by another user, for example, so that the center 102 always knows the latest vehicle condition of the vehicle 101.

Upon receiving the vehicle condition information of the vehicle 101 via the transceiver unit 301, the center 102 stores the vehicle condition information in the memory unit 303 such that the vehicle condition information is paired with (associated with) the vehicle 101, and also checks which ones of the remote operation items provides as services are actually performable in light of the received vehicle condition information (S702).

After this, the control unit 302 transmits email containing the vehicle condition information to the communication terminal 103 of the user of the vehicle 101 by use of the Internet server, function unit 304 (S703).

This email contains a link to the Web page for remote control request. The user receives this email at the communication terminal 103, and checks the email on the display unit 404. The use may then select the link by use of the user input unit 403 to access the Web page in order to request a remote operation after user authentication.

In this manner, the email for notifying the vehicle user of the vehicle condition includes an inquiry to the vehicle user, asking whether a remote operation is to be requested based on the vehicle condition.

As the vehicle user uses the communication terminal 103 to access the Web page for remote control request, the Internet server function unit 304 of the center 102 presents the selectable remote operation items on the Web page, thereby asking the vehicle user to make selection/determination (S703).

FIG. 8 and FIG. 9 are illustrative drawings showing examples of the display screen of such a Web page. In this example, the vehicle condition of the vehicle 101 is such that the driver-seat window is closed and the passenger-seat window is open. FIG. 8 shows an example in which only the operation items ascertained as actually performable are displayed at S702. FIG. 9 shows an example in which all the operation items provided as services are displayed, but the operation items ascertained as non-performable at S702 are presented such as not to be selectable. In the former case, data traffic is reduced, and the amount of scrolling of the display screen by the user may also be reduced since the number of displayed items is decreased. In the latter case, the vehicle user can check all the operation items provided as services regardless of whether they are selectable.

In either FIG. 8 or FIG. 9, items relating to the opening/closing of the driver-seat window and passenger-seat window are displayed as an example. Other operation items may be displayed by scrolling down. The execution button is always viewable regardless of the scrolled position, so that the user can press (select/click) the execution button after selecting a desired operation, thereby requesting the center 102 to perform the selected operation.

When the vehicle user desiring a remote operation selects an operation item and requests the execution of the operation (S704), the center 102 matches the requested operation item against the vehicle condition information stored in memory so as to check again whether the requested operation item is actually performable in light of the latest vehicle condition notice that has been received from the vehicle 101 since notifying the vehicle user (S705).

For example, when the driver-seat window is already closed, a remote operation request to close the driver-seat window is ascertained as being non-performable because the requested operation has already been performed.

If the remote control item requested by the vehicle user is ascertained to be non-performable ("NO" at S705), the control unit 302 of the center 102 does not transmit any instruction to the vehicle 101 (i.e., to its on-vehicle device 101'), and instead transmits a report to the communication terminal 103 to inform the user that the requested remote operation has failed because such operation has already been performed (S706).

If the remote operation item requested by the vehicle user is ascertained to be performable ("YES" at S705), the control unit 302 of the center 102 uses the transceiver unit 301 to transmit an operation instruction to the vehicle 101 (i.e., to its on-vehicle device 101') (S707).

In the vehicle 101, the transceiver unit 201 receives the operation instruction from the center 102. In response, the control unit 202 instructs the vehicle status monitoring/controlling unit 203 to perform the relevant operation (S708).

Upon the completion of the operation, the control unit 202 of the on-vehicle device 101' transmits a report indicative of the completion of the operation to the center 102 via the transceiver unit 201 (S508).

In the center 102, the transceiver unit 301 receives the report of the completion of the operation from the vehicle 101. In response, the control unit 302 instructs the Internet server function unit 304 to create a completion reporting mail that informs the user of the completion of the remote operation requested by the vehicle user. The created mail is transmitted to the communication terminal 103 (S710).

In this manner, according to the present embodiment, the data traffic between the center 102 and the communication terminal 103 can be reduced, and the possibility of reporting to the vehicle user that the requested remote operation has failed can be lowered.

The two embodiments of the present invention have been described heretofore. The present invention is not limited to these embodiments, and various other embodiments can be used.

For example, in the notice of the vehicle condition from the vehicle to the center, there may be some operation items for which no change in the condition is reported for a predetermined time period (e.g., no report is received indicating that a given window is closed or opened during this predetermined time period). In this case, it may be estimated that an anomaly such as machine failure has occurred with respect to such operation items, thereby ascertaining that a remote operation corresponding to such operation items cannot be performed in response to a request from the vehicle user. Provision may thus be made that an operation instruction is not transmitted to the vehicle in this case.

The present invention is applicable to a vehicle remote control apparatus and system. Further, it should be noted that the vehicle subjected to remote control by the vehicle remote control apparatus of the present invention can be any vehicle regardless of its exterior appearance, weight, size, drive performance, etc.

Although the present invention has been described with reference to embodiments, the present invention is not limited to these embodiments, but various variations and modifications may be made without departing from the scope of the invention as set forth in the accompanying claims.

The present application is based on Japanese priority application No. 2005-115981 filed on Apr. 13, 2005, with the Japanese Patent Office, the entire contents of which are hereby incorporated by reference.

The invention claimed is:

1. A vehicle remote control apparatus for causing a vehicle to perform a requested operation in response to a remote operation request from a vehicle user, comprising:
   an acquisition unit configured to acquire information about vehicle condition of the vehicle; and
   an operation instruction transmission controlling unit configured to compare a remote operation requested from the vehicle user with the information about the vehicle condition, to transmit an operation instruction corresponding to the requested remote operation to the vehicle if the requested remote operation has not been performed, and to refrain from transmitting an operation instruction corresponding to the requested remote operation to the vehicle if the requested remote operation has already been performed at the vehicle.

2. The vehicle remote control apparatus as claimed in claim 1, further comprising a presenting unit configured to present performable remote operations to the vehicle user based on the information about the vehicle condition in response to the acquisition by the acquisition unit of the information about the vehicle condition.

3. The vehicle remote control apparatus as claimed in claim 2, wherein the presenting unit is configured to present all possible remote operations to the vehicle user while making only the performable remote operations selectable among the possible remote operations based on the information about the vehicle condition.

4. The vehicle remote control apparatus as claimed in claim 2, wherein the presenting unit is configured to present only the performable remote operations to the vehicle user based on the information about the vehicle condition.

5. The vehicle remote control apparatus as claimed in claim 2, wherein the presenting unit is configured to ascertain a given remote operation as a non-performable remote operation if the given remote operation is not performed for a predetermined time period according to the information about the vehicle condition acquired by the acquisition unit.

6. A vehicle remote control system for causing a vehicle to perform a requested operation in response to a remote operation request from a vehicle user, comprising a vehicle having an on-vehicle device,
   wherein the on-vehicle device is configured to perform an operation with respect to the vehicle according to an operation instruction from a vehicle remote control apparatus, and to detect vehicle condition of the vehicle for notification to the vehicle remote control apparatus,
   and wherein the vehicle remote control apparatus is configured to compare a remote operation requested from the vehicle user with the information about the vehicle condition obtained from the on-vehicle device, to transmit an operation instruction corresponding to the requested remote operation to the vehicle if the requested remote operation has not been performed, and to refrain from transmitting an operation instruction corresponding to the requested remote operation to the vehicle if the requested remote operation has already been performed at the vehicle.

7. The vehicle control system as claimed in claim 6, wherein the vehicle remote control apparatus is configured to transmit information about performable remote operations to a communication terminal of the vehicle user based on the information about the vehicle condition in response to reception of the information about the vehicle condition from the on-vehicle device.

8. The vehicle control system as claimed in claim 7, wherein the vehicle remote control apparatus is configured to transmit information about all possible remote operations, with the performable remote operations made discernible, to the communication terminal based on the information about the vehicle condition in response to reception of the information about the vehicle condition from the on-vehicle device.

9. The vehicle remote control system as claimed in claim 7, wherein the vehicle remote control apparatus is configured to transmit only the information about the performable remote operations to the communication terminal based on the information about the vehicle condition in response to reception of the information about the vehicle condition from the on-vehicle device.

10. The vehicle remote control system as claimed in claim 7, wherein the vehicle remote control apparatus is configured to ascertain a given remote operation as a non-performable remote operation if the given remote operation is not performed for a predetermined time period according to the information about the vehicle condition obtained from the on-vehicle device.

* * * * *